United States Patent [19]

Musschoot

[11] Patent Number: 4,546,872
[45] Date of Patent: Oct. 15, 1985

[54] DISCHARGE CONTROL STRUCTURE FOR VIBRATORY APPARATUS

[75] Inventor: Albert Musschoot, Barrington, Ill.

[73] Assignee: General Kinematics Corporation, Barrington, Ill.

[21] Appl. No.: 579,305

[22] Filed: Feb. 13, 1984

Related U.S. Application Data

[63] Continuation-in-part of Ser. No. 379,655, May 19, 1982, abandoned.

[51] Int. Cl.$^4$ ............................................. B65G 47/19
[52] U.S. Cl. ................................. 198/525; 198/533; 222/199
[58] Field of Search ...................... 198/530, 532–534, 198/535, 537, 525; 222/286, 198–200, 203

[56] References Cited

U.S. PATENT DOCUMENTS 2,468,712  4/1949  Kohler .
3,622,018  11/1971  Morris .
4,131,193  12/1978  Musschoot .

Primary Examiner—Joseph E. Valenza
Assistant Examiner—Lyle Kim
Attorney, Agent, or Firm—Wood, Dalton, Phillips, Mason & Rowe

[57] ABSTRACT

A vibratory apparatus is provided for depiling or unpiling a mass of particulate material. The apparatus is positioned in a recess or opening in a base, such as the ground, and particulate material piled thereover. Upon being vibrated, the apparatus delivers the material from a pile at a regulated rate onto a conveyor system for transport to a place of use. Gate means that are translationally and rotationally adjustable are provided in the discharge opening to arrest the flow of particulate material when the vibratory apparatus is not operating.

5 Claims, 8 Drawing Figures

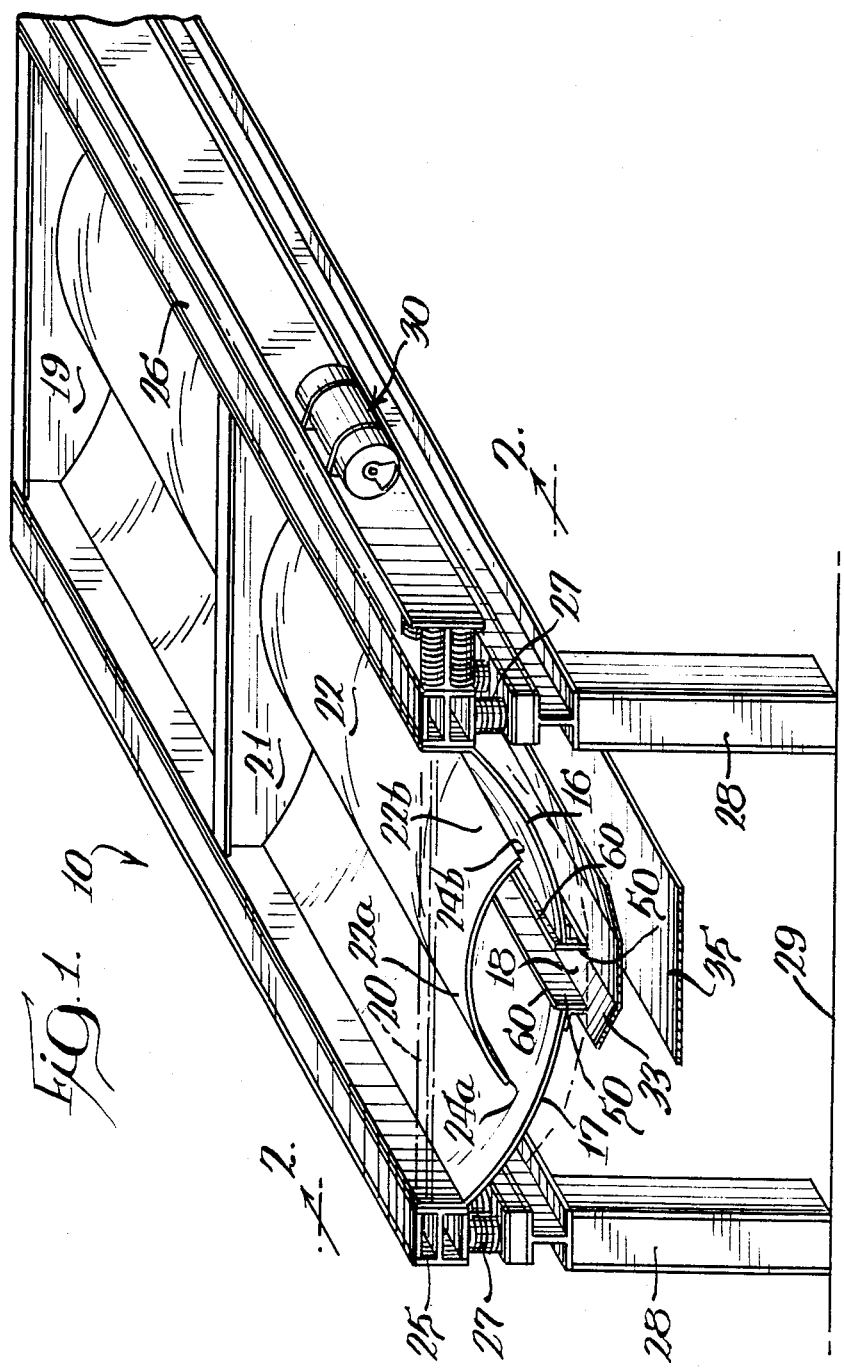

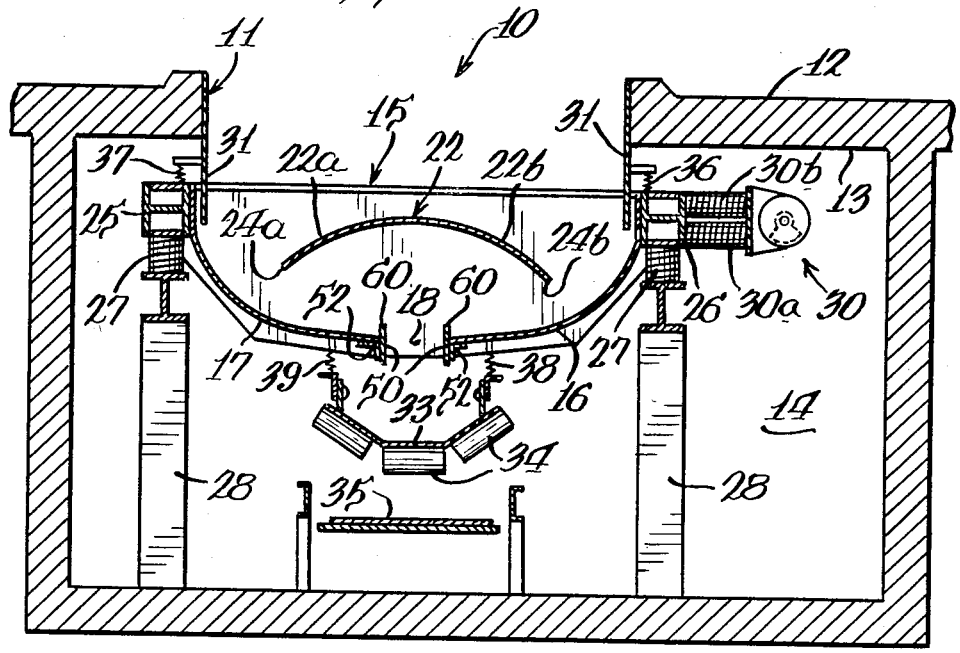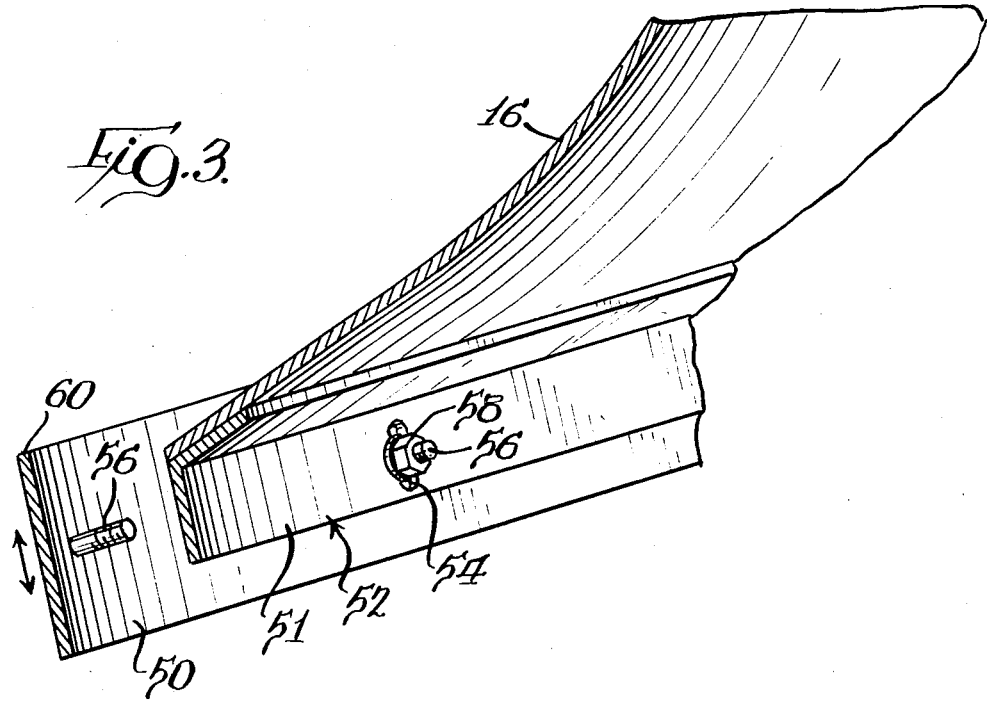

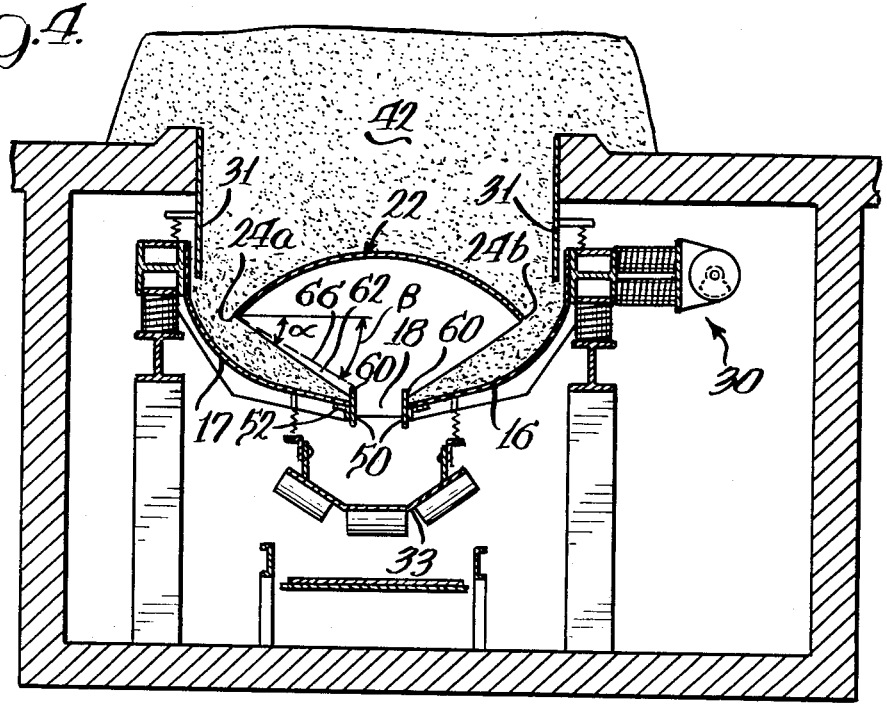
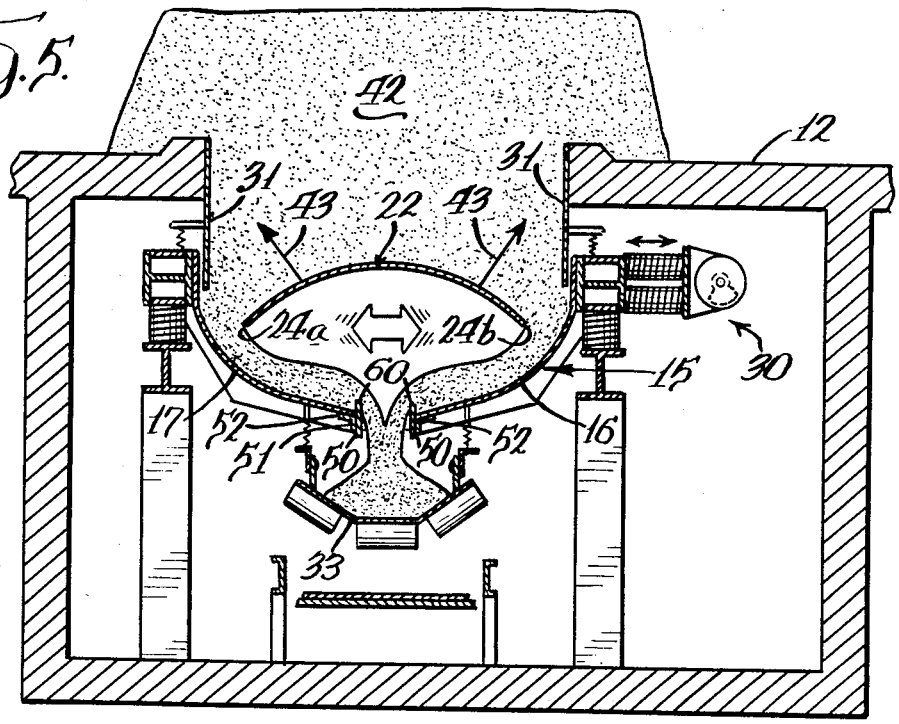

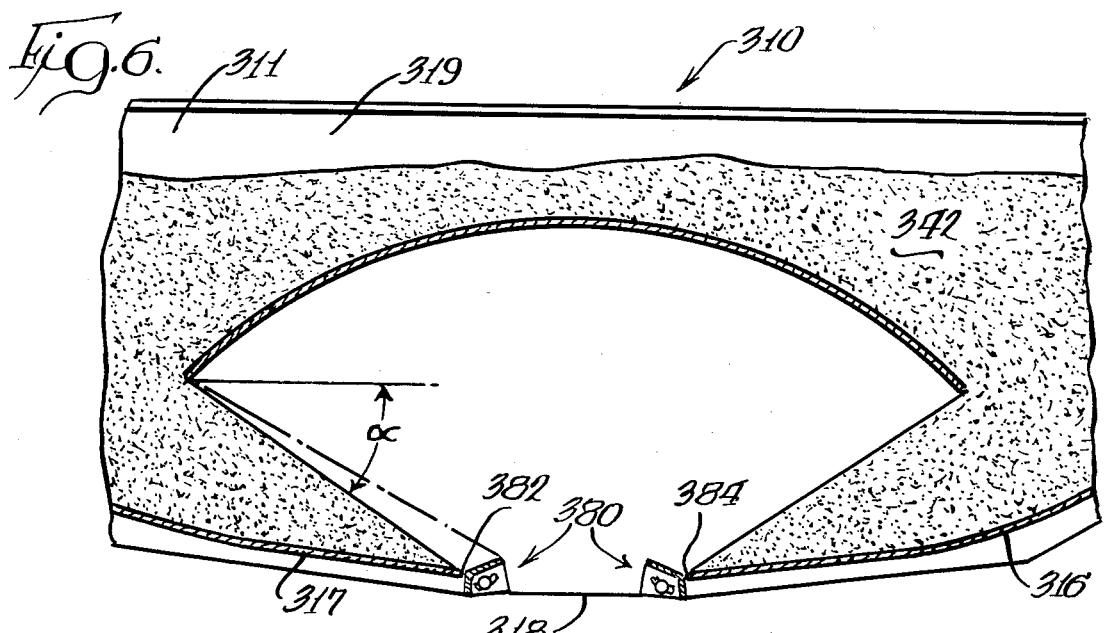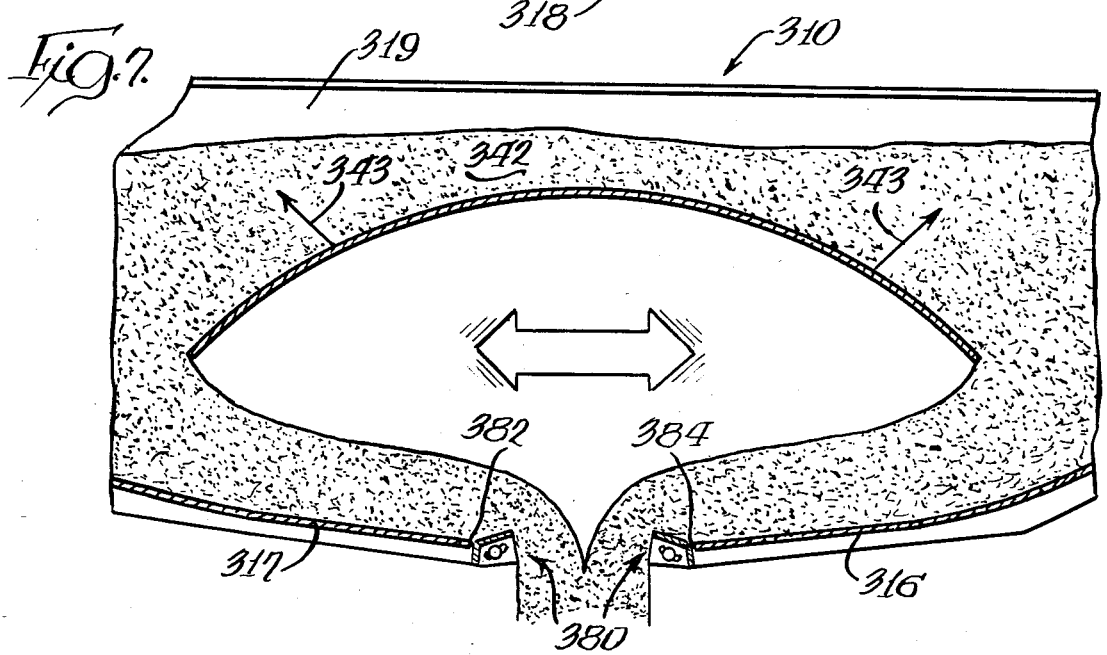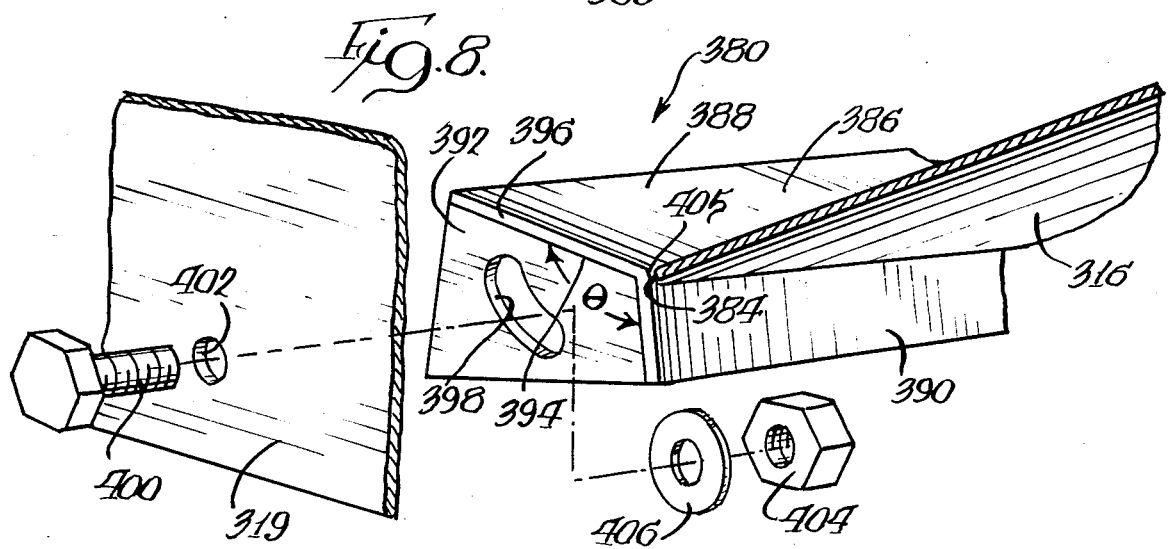

DISCHARGE CONTROL STRUCTURE FOR VIBRATORY APPARATUS

CROSS-REFERENCE

This is a continuation-in-part of my copending application Ser. No. 379,655 filed May 19, 1982 and entitled "Vibratory Apparatus", which became abandoned.

BACKGROUND OF THE INVENTION

De-pilers, or unpiling apparatus, have been used for quite some time. The normal application is in conjunction with a power station or other coal burning facility wherein large piles of coal are dumped over openings in the ground which lead into tunnels communicating with the furnace or other place of ultimate use. In such installations, a cylindrical hopper is located in the opening beneath the pile and the hopper can be vibrated in order to deliver material from the pile into the feeder. The feeder feeds the material delivered thereto at a regulated rate, the outlet of the feeder being connected to a conveyor such as a belt or the like which carries the coal at a predetermined rate to a furnace or other place of use. While feeders in the system just described normally operate constantly, the hoppers are operated at spaced intervals with periods of rest therebetween. This is normally because the delivery rate of the hoppers far exceeds the requirement of the feeders, and if the hoppers were vibrated with material therein which was not being discharged, the material would tend to pack and eventually bridge, causing cessation of flow.

The apparatus disclosed in my U.S. Pat. No. 4,131,193 issued Dec. 26, 1978, has eliminated the hopper structure and has been very successful in unpiling particulate material. The structure patented in the '193 patent includes adjustable extension members on a deflector for regulating flow of the material by controlling the static angle of repose of the material when the vibratory apparatus is not operating.

SUMMARY OF THE INVENTION

According to the present invention, an improved structure is provided for regulating the delivery of material. The structure is such that upon starting the vibratory apparatus the material will again readily start to flow and continue to flow at a desired rate. The structure is such that no large head of material builds up against the structure causing start up problems due to compacting of the particulate material behind the structure. The structure is located in a way that it can be adjusted to vary its setting without removing all of the material stacked up on the apparatus. Preferably, the vibratory apparatus is arranged so that its rate of feed or delivery of the material can be varied. The arrangement is such that when the feeder is stopped, delivery of material also ceases; when the feeder is again started, delivery will resume. Also, if desired, the feeder may be operated continuously over relatively long periods. The result is that any tendency of the material to bridge or clot is avoided, the rate of delivery from the pile to the conveyor can be regulated, and a more efficient delivery of particulate material to the ultimate place of use can be achieved.

In particular, a gate having angled flanges is mounted in the flow path of the material for controlling the flow of the particular material from the depiler. The gate is mounted for translational and rotational movement so as to vary the flow cut off as desired.

BRIEF DESCRIPTION OF THE DRAWINGS

FIG. 1 is a perspective view of the vibratory apparatus portion of the present invention;

FIG. 2 is a vertical section along line 2—2 of FIG. 1;

FIG. 3 is an enlarged broken away view of a portion of the gate forming a part of the apparatus in FIG. 2;

FIG. 4 is a vertical section like FIG. 2 showing the apparatus at rest but with material piled thereover;

FIG. 5 is a view like FIG. 4 with the apparatus in operation;

FIG. 6 is a vertical section showing a modified form of the apparatus at rest with material piled thereover;

FIG. 7 is a view like FIG. 6 with the modified apparatus in operation; and

FIG. 8 is an enlarged broken away view of a portion of one of the modified discharge control gates in FIG. 6.

DESCRIPTION OF THE PREFERRED EMBODIMENT

Referring now to the embodiment of the invention shown in FIGS. 1 and 2, there is provided a vibratory apparatus 10 to be mounted just below a large opening or aperture 11 in a base 12. Actually, the base is formed by a concrete top 13 forming a portion of a tunnel or passage 14 beneath the opening. Under normal circumstances, the top of the base 12 will be at ground level and the aperture 11 is located immediately below a dumping place for the particulate material to be handled. In the normal installation, the material is coal, reduced to relatively small size, and an elevated railroad track is located over the aperture 11 so that the railroad cars carrying coal can be emptied with their contents falling downwardly and forming a pile on the base overlying the aperture 11. Located within the aperture 11 is the vibratory apparatus which includes a rectangular (preferably square) trough 15 having side walls 16 and 17 sloping downwardly to a center opening 18 which extends the entire length of the trough. The trough has end walls 19 and 20 and a center wall 21 which are vertically arranged as shown.

Overlying the opening 18 in the trough is a deflector generally designated 22 which has a first portion 22a arching downwardly from the center of the deflector toward the side wall 17 of the trough, and a second portion 22b arching downwardly from the center toward the side wall 16. The highest portion of the deflector 22 is spaced above the center of the opening 18.

The trough 15 is secured to beams 25 and 26 extending along the sides thereof with the beams being supported on isolation springs 27 carried by posts 28 supported on the floor 29 of the tunnel 14.

A vibration generator 30 is secured by means of springs 30a and 30b to the beam 26 in order to impart vibrations to the trough 15. Preferably, the vibration generating apparatus 30 is similar to that shown in my U.S. Pat. No. 3,358,815, so that the amplitude of the vibrations generated thereby may be varied in order to vary the rate of discharge of the particulate material.

Material discharged from the trough 15 through the opening 18 falls upon a conveyor belt 33 moving on idlers 34 through the tunnel 14. The return of the belt is indicated at 35.

Dust seals 36 and 37 extend between a pair of vertical plates 31 forming the edges of the aperture 11, and the top of the beam 25 and 26. A second pair of dust seals 38 and 39 extend between the bottom of the trough 15 and the edges of the conveyor.

When the material is piled on the trough 15, it ultimately forms a large pile over the base 12 completely covering the opening 11. The material tends to pile up and stop between the outer edges of the extension members and the tops of the adjacent side walls 16 and 17 of the trough. In this condition, with the trough at rest, no material is delivered through the opening 18 onto the conveyor 33.

The angle of repose, sometimes called the slump angle, of a particulate material depends upon the nature of the particulate material involved. Some materials may be piled higher (large angle of repose) than other material. When the piling continues after the pile of material has reached its angle of repose, the material will slump, increasing the diameter of the base of the pile while maintaining the angle of repose constant. Vibrating a pile of material dramatically reduces the angle of repose. The apparatus and mode of operation thereof as described hereinabove is substantially as shown and described in my issued U.S. Pat. No. 4,131,193, which patent is incorporated herein by reference.

In the patented apparatus, it has been found advantageous for handling certain particulate material to have as narrow a deflector 22 as is possible so as to open up the flow path around the side edges 24a and 24b of the first portion 22a and second portion 22b, respectively, of the deflector 22. However, in opening up the flow path around the edges of the deflector 22, the material could continue to flow from the pile to the conveyor 33 even with the vibration generating apparatus 30 shut off. That is, the angle of repose of the material is such that the inner edges of the line forming the angle of repose with the horizontal overlaps the center opening 18 such that some material can continue to flow to the conveyor 33 even with the apparatus shut off. To control the flow of material when the vibration generating apparatus 30 is shut off, adjustable gates 50 are secured to the edges of the center opening 18 which gates 50 will intersect the angle of repose of the particulate material arresting further free flow of the material. Specifically, a pair of downturned flanges 51, in the form of angle members 52 which are welded to the underside of the side walls 16 and 17 of the trough 15, define the elongate side edges of the rectangular center opening 18. A plurality of longitudinally spaced apart and parallel elongate slots 54 are formed through the downturned flanges 51. Each gate 50 is secured to one flange 51 by a plurality of transversely projecting threaded studs 56 secured to said gate and extending through the slots 54 in the flange 51. Nuts 58, threaded on the studs 54 and tightened, will lock the gates 50 in place on the trough 15. The upper edge 60 of each gate 50 can be vertically adjusted to a desired position above the walls 16 and 17 of the trough by loosening the nuts 58, relocating the gates 50 and retightening the nuts so as to lock the gates in position on the trough 15.

It is known that each particulate material has a particular angle of repose in a static state, such an angle of repose being designated α in FIG. 4 of the drawings. Without the gates 50 in FIG. 4, it can be seen that the line 62 representing the one side of the angle of repose of the material overlaps the center opening 18 such that, under the teaching of my '193 patent will permit the material to, at least in part, continue to flow onto the conveyor 33. This flow would be particularly true where the width of the deflector has been reduced to a desired minimum. By providing the adjustable gates 50 on the elongate edges of the center opening 18 and setting the gates so that the upper edges 60 of the gates are above the line 62 defining the angle of repose α of the material will stop the flow of material when the vibration generating apparatus 30 is shut off. Upon starting the vibration apparatus 30 the angle of repose of the material decreases to an extent that the material will flow over the edges 60 of the gate and onto the conveyor.

Access to the adjustments for the gates 50 is relatively simple and can be accomplished without removing the pile material stacked above the apparatus. That is, by loosening the nuts 58, the gates 50 can be forced up or down relative to the trough 15 without difficulty. The upper edges 60 of the gates 50 should be located so that a line drawn from the edges 60 to the edges 24a and 24b of the deflector forms an angle with the horizontal that is less than the static, at rest, angle of repose of the particular particulate material being handled. At rest, the upper surface 62 of the material coincides with the line 62 defining the angle α with the horizontal which is the static angle of repose of the material. The angle B of the line 66 drawn from the edge of the deflector to the top edges 60 of the gates 50 is less than the angle of repose α of the material, in FIG. 4, so material will not flow. When the vibratory apparatus is activated, the angle of the surface of the material becomes less than the angle B whereupon the material will flow over the gates 60 onto the conveyor 33.

An alternative structure to the adjustable gates 50 in FIGS. 1-5 is illustrated in FIGS. 6-8 at 380. The vibratory apparatus at 310 in FIGS. 6 and 7 is, with the exception of the gates 50, identical to that previously described including the end walls 319, sidewalls 316, 317 and the discharge opening 318 defined lengthwise of the trough between the free edges 382, 384 of the sidewalls 316, 317.

Each gate 380 comprises an angle member 386 having a deflecting flange 388 and an integral depending flange 390 with an included angle θ therebetween equal to approximately 110°. Flat reinforcing plates 392, at least two of which are end plates, conform closely to the underside region 394 of the angle member 386 and the ones that serve as end plates are situated flush with the free ends 396 of each gate 380. The plates 392 are conventionally attached to the angle member 386, as by welding.

The plates 392, that act as end plates, rigidify the ends of the respective member 386 and include a curved slot 398 for reception of an anchoring bolt 400 which adjustably connects the plate 392 with an endwall 319. The bolt 400 passes from the outside through an aperture 402 in the endwall 319 into the slot 398 and is secured with a nut 404 and washer 406. The flanges 388, 390 on each gate 380 are substantially straight along their length and are joined along an arc 405 which arc makes close, mating engagement with the free edges 382,384 of the sidewalls 316, 317 to prohibit the passage of material therebetween.

Adjustment of the gates is controlled by the guided movement of the bolts 400 within the slots 398. For illustration, and referring to the left hand gate 380 in FIG. 7 which is juxtaposed about free edge 382 of sidewall 317 for illustration, it can be seen that upon shifting the gate fully counterclockwise that the deflecting flange 388 of the gate will be disposed in a more vertical position to prevent overflow of material having a relatively small angle of repose. For material having a high angle of repose, the left hand gate can be pivoted clockwise so that the deflecting flange 388 is almost horizontal. In each just enumerated example the right hand gate is pivoted just the opposite, i.e., for materials with small angles of repose, pivot the righthand gate clockwise—for materials with large angles of repose, pivot the righthand gate counterclockwise.

A two-dimensional adjustment capability, translational and rotational, is provided including shifting of the bolt position within the slot and rotation of the gate 380 about the bolt 400. Adjustment can be made depending upon flow characteristics desired and the particular angle of repose α for the material. Although the slot 398 is illustrated in the end plates 392 it is understood that the slots 398 could be in the endwalls 319.

The conveyor will exhibit substantially the same operating characteristics as previously described between static and vibrating conditions. Adjustment of the gates 380 is facilitated by reason of the end connection of the gates with the endwalls 319. One need only release the two bolts 400 at the ends of each angle member 386 to effect a desired adjustment of the gate. This can be accomplished without emptying the material from the trough.

A feature of the apparatus is that the vibration is horizontal and normal to the longitudinal axis of the trough 15. Each sloping side wall 16, 316 and 17, 317 acts as a vibratory feeder, feeding the material carried thereon toward the adjacent edge of the opening 18, 318.

Also, when the vibrator is in operation, vibratory forces are transmitted into the pile 42, 342 of particulate material overlying the opening 11, 311, the primary vibrating forces being along the lines of the arrows 43, 343 which are generally parallel to the internal shear angles of the material, such shear angles being themselves generally parallel to the angle of repose of the material at rest. Thus, de-piling freely occurs as the vibrator is actuated, and flow ceases when the vibrator is stopped.

I claim:

1. In a vibratory apparatus for delivering particulate material and adapted for use in combination with a base having an aperture therein communicating with a passage beneath the base, said vibratory apparatus comprising a trough having an opening in the bottom thereof with the opening extending from one end of the trough to the other end thereof, said trough having spaced end walls, side walls sloping downwardly and inwardly from the side of the trough to said opening, each said side wall having an elongate edge defining a part of said opening, a deflector secured to the trough and extending upwardly therefrom, said deflector having its lower edges spaced from the side walls of the trough and havings its center portion located above the opening in the trough, means for mounting said vibratory apparatus in said aperture in the base to support material piled thereover, said mounting means including springs supporting the trough for vibratory movement, a vibration generator secured to said apparatus for vibrating the same in a direction transverse to the direction of extent of the opening, and a conveyor below the opening in the trough to receive material discharged therethrough, and means for controlling flow of material into the elongate opening comprising:
   a gate extending lengthwise adjacent each said edge of each side wall; and
   means for mounting said gate for multi-dimensional adjustment relative to the adjacent edge,
   whereby the angle to the horizontal of a line drawn from the uppermost part of each gate and the nearest adjacent lower edge of the deflector is adjustable to be compatible with the static angle of repose for different particulate materials.

2. The vibratory apparatus according to claim 1 wherein said gate comprises integral first and second flanges in angled relationship, one of said flanges situated in close mating relationship with the adjacent, elongate, sidewall edge to prohibit the passage of material therebetween.

3. The vibratory apparatus of claim 1 wherein each said gate extends between the endwalls of the trough and has ends adjacent the end walls, each said end has a plate rigidly attached thereto and said means for mounting the gate adjustably connects between the adjacent plates and end walls.

4. The vibratory apparatus of claim 2 wherein said first and second flanges define an included angle of approximately 110°.

5. The vibratory apparatus of claim 3 wherein the means for mounting each gate comprises a curved slot provided either in said end walls or in said plates at each end of the gate, an aperture is provided either in the other of said end walls or in the other of said plates and coincides with said slot and means extend through said aperture and slot and are guided with said slot to permit both relative translational and rotational movement of the plate and gate relative to the end walls.

* * * * *